US012639111B2

(12) United States Patent
Richmond et al.

(10) Patent No.: US 12,639,111 B2
(45) Date of Patent: May 26, 2026

(54) ESTIMATION OF POWER PROFILES FOR NEURAL NETWORK MODELS RUNNING ON AI ACCELERATORS

(71) Applicant: Intel Corporation, Santa Clara, CA (US)

(72) Inventors: Richard Richmond, Belfast (GB); Eric Luk, Dublin (IE); Lingdan Zeng, Chandler, AZ (US); Lance Hacking, Spanish Fork, UT (US); Alessandro Palla, Pisa (IT); Mohamed Elmalaki, Gilbert, AZ (US); Sara Almalih, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 9 days.

(21) Appl. No.: 17/856,968

(22) Filed: Jul. 2, 2022

(65) Prior Publication Data

US 2023/0004430 A1 Jan. 5, 2023

(51) Int. Cl.
*G06F 9/48* (2006.01)
*G06N 3/10* (2006.01)

(52) U.S. Cl.
CPC ............. *G06F 9/4893* (2013.01); *G06N 3/10* (2013.01)

(58) Field of Classification Search
CPC ................................ G06F 9/4893; G06N 3/10
See application file for complete search history.

(56) References Cited

U.S. PATENT DOCUMENTS

| | | | | | |
|---|---|---|---|---|---|
| 2009/0327784 | A1* | 12/2009 | Shah | G06F 11/3062 | 713/340 |
| 2013/0305075 | A1* | 11/2013 | Vasan | G06F 11/3062 | 713/340 |
| 2018/0182136 | A1* | 6/2018 | Zeyl | G06F 9/5038 | |
| 2019/0187775 | A1* | 6/2019 | Rotem | G06F 1/324 | |
| 2021/0081763 | A1* | 3/2021 | Abdelfattah | G06N 3/044 | |
| 2023/0027162 | A1* | 1/2023 | Perryman | G06F 11/3062 | |
| 2023/0418688 | A1* | 12/2023 | Wang | G06F 9/5094 | |

OTHER PUBLICATIONS

Cheema et al., Power and Performance Analysis of Deep Neural Networks for Energy-aware Heterogeneous Systems, Oct. 11, 2020, 2020 IEEE International Conference on Systems, Man, and Cybernetics (SMC) (Year: 2020).*

* cited by examiner

*Primary Examiner* — Ryan Bertram
(74) *Attorney, Agent, or Firm* — Akona IP PC

(57) ABSTRACT

Technology for estimating neural network (NN) power profiles includes obtaining a plurality of workloads for a compiled NN model, the plurality of workloads determined for a hardware execution device, determining a hardware efficiency factor for the compiled NN model, and generating, based on the hardware efficiency factor, a power profile for the compiled NN model on one or more of a per-layer basis or a per-workload basis. The hardware efficiency factor can be determined on based on a hardware efficiency measurement and a hardware utilization measurement, and can be determined on a per-workload basis. A configuration file can be provided for generating the power profile, and an output visualization of the power profile can be generated. Further, feedback information can be generated to perform one or more of selecting a hardware device, optimizing a breakdown of workloads, optimizing a scheduling of tasks, or confirming a hardware device design.

20 Claims, 8 Drawing Sheets

200

```
f2v:
    'Freq':
        VF: [
            [v1, f1],
            [v2, f2],
            ...
power_nodes:
    node 1:
        freq: ['Freq', 'M']
        perf: 'Util'
        num: 'numUnits'
        cdyn_nF: *
        lkg: {pwr_w: *, v: *}
    node 2:
        freq: ['cache freq', 'M']
        perf: 'Util'
        num: 'numUnits'
        cdyn_nF: *
        lkg: {pwr_w: *, v: *}
    node 3:
        freq: ['cache freq', 'M']
        perf: 'Util'
        num: 'numUnits'
        cdyn_nF: *
        lkg: {pwr_w: *, v: *}
    node 4:
        children: [node 1, node 2, node 3]
    ...
```

Time: t1: 0.000us, t2: 1221.827us, Delta: 1221.827us, Memory shot: 0.000us, DPU-on time: 87.27%, Effective DMA bw: 37.94%, FPS: 818.447

Time: t1: 0.000us, t2: 1221.827us, Delta: 1221.827us, Memory shot: 0.000us, DPU-on time: 87.27%, Effective DMA bw: 37.94%, FPS: 818.447

400

410 Obtain a plurality of workloads for a compiled neural network (NN) model

410a The plurality of workloads is determined for a hardware execution device

420 Determine a hardware efficiency factor for the compiled NN model

420a The hardware efficiency factor is determined on based on a hardware efficiency measurement and a hardware utilization measurement 420b The hardware efficiency factor is determined on a per-workload basis 430 Generate, based on the hardware efficiency factor, a power profile for the compiled NN model on one or more of a per-layer basis or a per-workload basis 440 Provide a configuration file to be used for generating the power profile 450 Generate an output visualization of the power profile 460 Generate feedback information to one or more of select a hardware device, optimize a breakdown of workloads, optimize a scheduling of tasks, or confirm a hardware device design

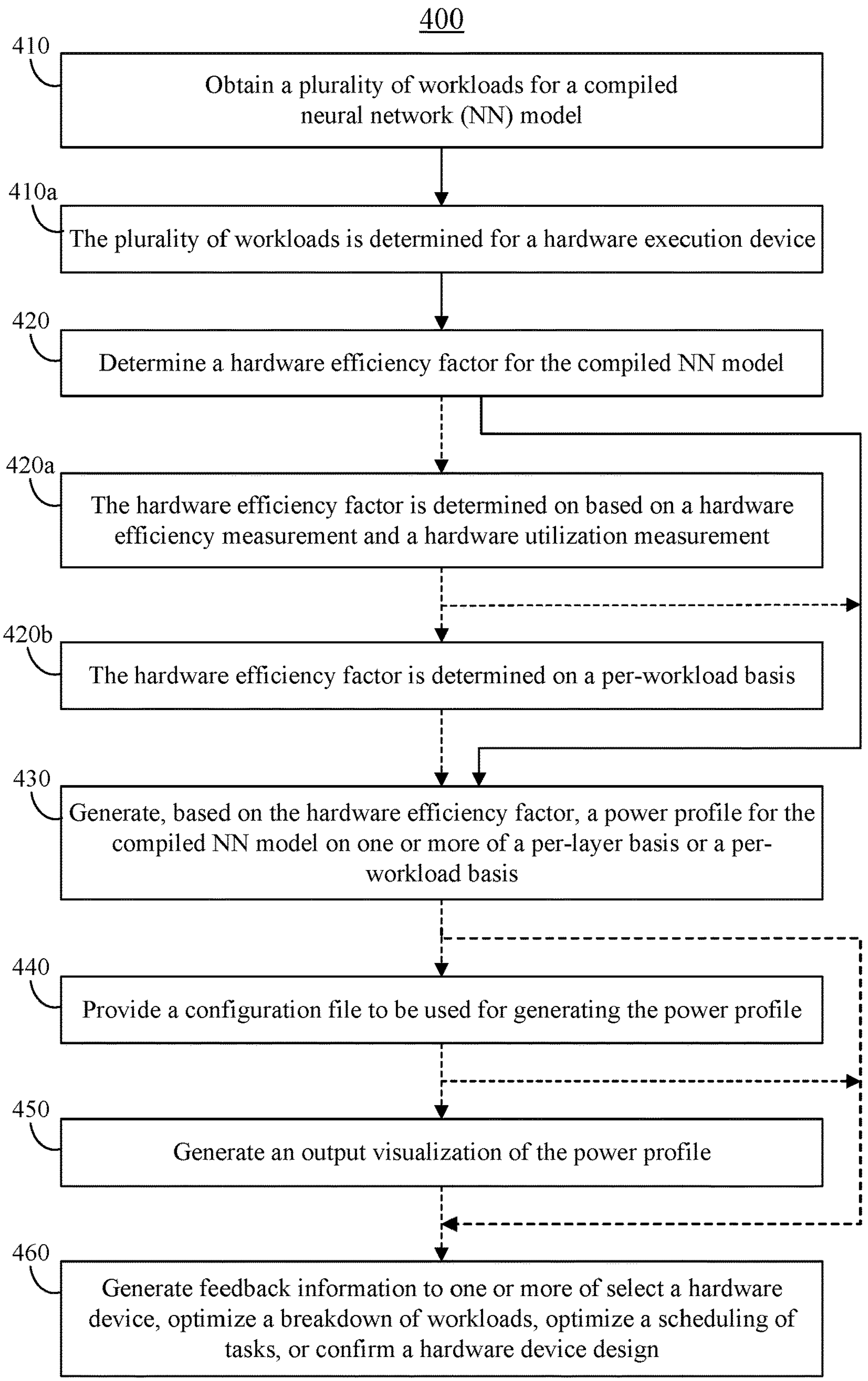

FIG. 4

ESTIMATION OF POWER PROFILES FOR NEURAL NETWORK MODELS RUNNING ON AI ACCELERATORS

TECHNICAL FIELD

Embodiments relate generally to computing systems. More particularly, embodiments relate to power profile estimation for neural networks on AI accelerators.

BACKGROUND

Neural networks are diverse in terms of their topology, computational intensity, and memory bandwidth requirements. For any given artificial intelligence (AI) accelerator architecture, the performance or overall throughput for any given network is a function of all three elements (e.g., topology, computational intensity, and memory bandwidth requirements). Within a network, the computational intensity can vary from layer to layer depending on the tensor dimensions, kernel size and other factors which determine how efficiently the operations map to underlying hardware architecture. Power consumption can vary greatly with computational intensity, leading to spikes in power consumption for significant periods even when the average power over a network is moderate. With current power modeling tools and performance simulators, however, only average power estimations are possible.

Previous power modeling solutions tend to be populated with data from well-known power and performance benchmarks for long-established devices, such as central processing units (CPUs) and graphics processing units (GPUs). Generally, for such devices the prior architecture has only small deltas versus the next generation. By contrast, for AI hardware, architectures evolve quickly to keep apace the development of new network topologies and operations. Consequently, building an accurate power model for a next generation AI accelerator is challenging and time consuming.

BRIEF DESCRIPTION OF THE DRAWINGS

The various advantages of the embodiments will become apparent to one skilled in the art by reading the following specification and appended claims, and by referencing the following drawings, in which:

FIG. 2 provides a diagram of sample code illustrating generation of an example power configuration file according to one or more embodiments;

FIG. 4 provides a flow chart illustrating an example method of generating a power profile for a neural network according to one or more embodiments;

DESCRIPTION OF EMBODIMENTS

Figure 1:
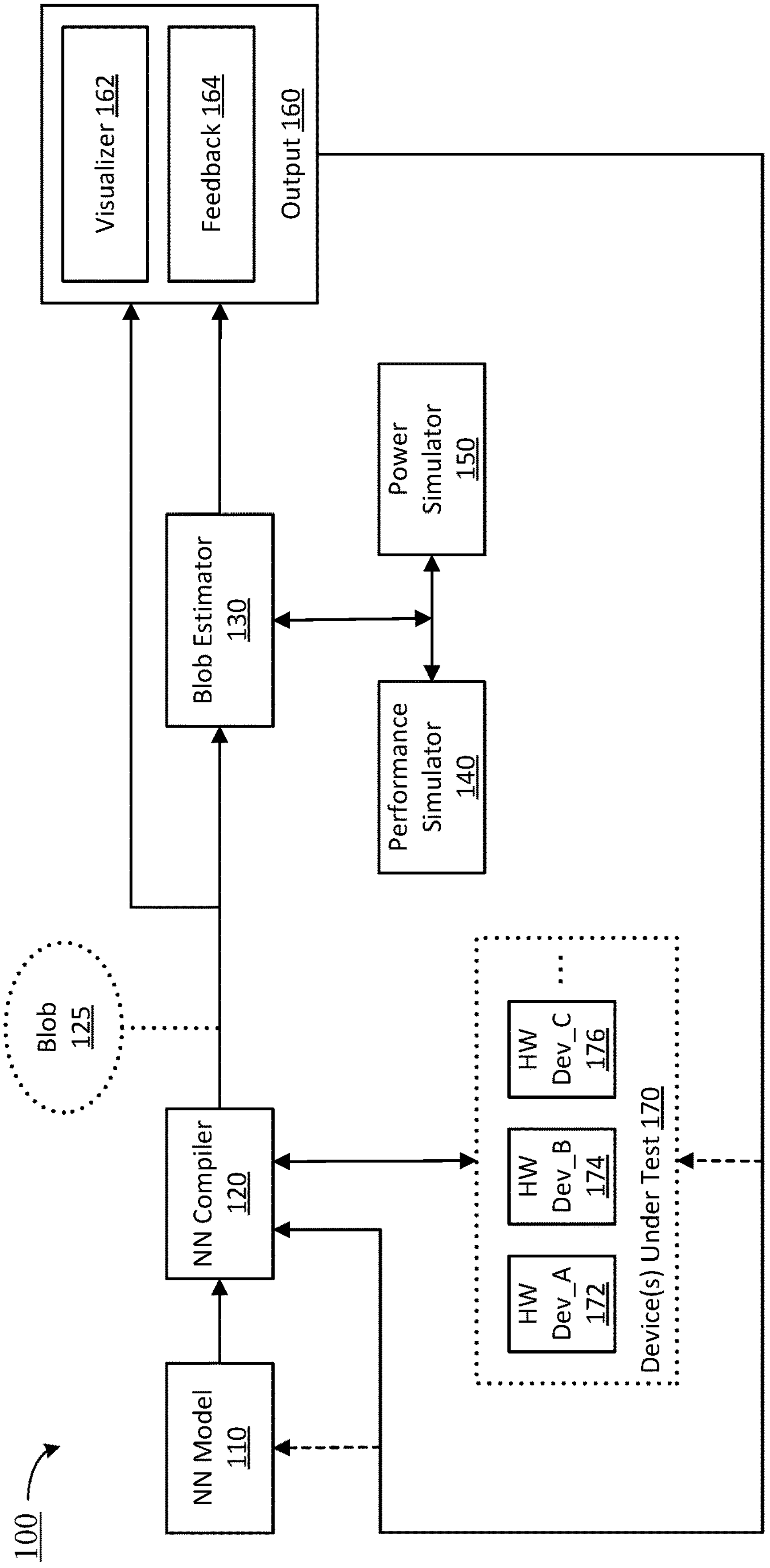
FIG. 1 provides a block diagram illustrating an example of a neural network power profile estimation system according to one or more embodiments.

An improved computing system as described herein provides technology for estimating power profiles for neural networks on current or future architectures for peak power consumption as well as average power. The technology provides valuable information that can inform design decisions for networks, hardware architectures or micro-architectures, and system-on-chip (SoC) power delivery and management. The technology also enables per layer and/or per workload power estimation, enabling fine-grained power profiling—which current models and simulators cannot achieve.

The improved technology as described herein provides for measuring or estimating power consumption in neural networks on a workload by workload basis or a layer by layer basis, and further enhanced by taking hardware efficiency into consideration. For example, by utilizing neural network compiler and network performance simulation, which model the hardware architecture at an abstract level, the power consumption per workload or per layer is profiled in the neural network at an early stage in the architecture development. Estimating the power consumption on a workload by workload or layer by layer basis enables fine power optimization on AI accelerator devices. This allows a power profile to be constructed providing a fine-grained power estimation—down to a per-workload or per-layer basis—within a short compute run time. Such power profiling also gives insights which are valuable for SoC power delivery and power management planning. Additionally, when well calibrated against power estimations derived by annotation of switching activity—e.g., from register-transfer level (RTL) simulation—onto an implementation of a given design (e.g., using Synopsys PrimePower or similar tool), the system can be used to quickly provide power profiles for many neural networks with a quick turn-around time. The information obtained from such an exercise can be used to construct complex scenarios which would not otherwise be possible without an unfeasible amount of RTL simulation. This new system also enables non-experts in power estimation to easily create power estimation profiles for arbitrary neural networks.

Power consumption in a digital circuit has two major elements: leakage power and dynamic power. Leakage depends on the technology process and the cell Vt (threshold voltage) type mix of the design. For example, a technology process library used to implement the design consists of standard cells which implement logic gates or sequential elements. Typically a library will have low (LVT), standard (SVT) and high (HVT) Vt versions of each cell. The LVT cells will be faster but will exhibit higher leakage current. Therefore in any implementation of a design there can be a trade-off between performance (speed) and power (leakage). Leakage can be modelled as a constant which scales approximately linearly with voltage (within a certain range) and non-linearly with temperature. Dynamic power can be further divided into two elements, the idle (or static) power and the application power. The idle power term models the power consumed by the design while idle, this is power consumed by the clock tree and other structural elements which is invariant with the amount of work being done (computational intensity). The application power is the portion of dynamic power which varies with work being done (and therefore switching activity) in the circuit for a constant voltage and frequency.

Power estimation tools (such as, e.g., Synopsys PrimePower) can estimate the average power consumed by a technology implementation of a design by annotating switching activity captured from a simulation of the design to its netlist. A detailed breakdown of the power consumed at each level of hierarchy may be attained. The resulting power estimation will be for a given simulation (e.g. a particular application or workload), a given process, voltage and temperature (PVT) corner and a given frequency of operation. Process refers to the statistical distribution of fabricated chips and , for example, there can be slow, typical or fast process corners. A particular chip will be binned as either slow, typical or fast. However, the voltage and temperature it operates at may be dynamic variables for any operation or use case. Factoring out the leakage power, the dynamic power $P_{dyn}$ may then be used with the known voltage (V) and frequency (f) to give the dynamic capacitance ($C_{dyn}$) of the design for the activity (A) of the particular application or workload as follows:

$$C_{dyn}=P_{dyn}/(A*V^2*f) \quad \text{EQ (1)}$$

$C_{dyn}$ therefore provides a constant which can be used to predict the power for different workloads (changing the activity A), different frequencies and/or voltages. As further described herein, the technology includes providing for power estimation with the additional accuracy provided with per layer per workload estimates enhanced with estimated hardware efficiency for the particular hardware device (e.g., AI accelerator). For example, this can include breaking an AI inference use case down into tens or hundreds of layers/workloads, and provides more accurate per layer/workload power estimation by taking into consideration the hardware efficiency as well as $C_{dyn}$, application ratio (AppRatio), frequency, voltage, and leakage. The peak power of a function or hardware can be characterized as power for an application ratio of 100%. Other workloads (or applications) with a power profile lower than the peak can be defined as having an AppRatio less than 100%. Accordingly, the technology enables identification of which layers/workloads in a neural network are more power constrained.

FIG. 1 provides a block diagram illustrating an example of neural network power profile estimation system 100 according to one or more embodiments, with reference to components and features described herein including but not limited to the figures and associated description. As shown in FIG. 1, the system 100 includes a neural network (NN) model 110, a neural network compiler 120, a blob estimator 130, a performance simulator 140, a power simulator 150, and an output unit 160. In embodiments, the system 100 also includes one or more hardware device(s) 170 (e.g., hardware accelerator devices) under test. For example, hardware devices 170 under test can include a first device (HW Dev_A) 172, a second device (HW Dev_B) 174, and/or a third device (HW Dev_C) 176. A fewer or greater number of devices can be included in the hardware devices 170. The hardware devices 170 can include various types of AI accelerators such as, e.g., a vision processing unit (VPU). It will be understood that in embodiments one or more of the hardware devices 170 under test may not be an actual physical hardware device but, instead, can represent design criteria and parameters for existing or proposed hardware device architecture/designs.

The neural network model 110 is a pre-trained model, which in embodiments can be received (obtained) by the system 100 from an AI framework. The NN model 110 can be developed using an AI framework from a variety of sources, including, for example, TensorFlow, ONNX Runtime, PyTorch, Caffe, OpenVino, etc. The NN model 110 typically includes information and data regarding the model architecture/topology (i.e., graph), including tensor volumes, nodes, operators, weights and biases. Each node in a model graph represents an operation (e.g. mathematical, logical operator etc.) which is evaluated at runtime. The NN model 110 is provided as input to the NN compiler 120.

The neural network compiler 120 compiles the NN model 110 into executable code to be run on selected hardware (e.g., one of the hardware devices 170). The NN compiler 120 decomposes a network model into workloads which form a blob 125 that is adapted for execution on the selected hardware device 170 (e.g., an AI accelerator). As part of this process, the NN compiler 120 can decompose a layer or a full workload into many sub-workloads. For example, the neural network compiler 120 breaks the input tensor at a layer into a series of workloads which map efficiently to the hardware device 170 that is to execute the NN model 110, where each layer of the neural network model will have an input tensor, which is generally the output tensor of the previously layer. A tensor is a multi-dimensional array of activations, where activations are individual data-points of a tensor. Additionally, the neural network compiler 120 performs task assignment, e.g. computation, direct memory access (DMA) to control data movement in and out of the hardware device 170, etc.; and schedules each task on a timeline. The compiled results are stored in a blob 125, which is a time graph with tasks placed in series or in parallel depending on the scheduling strategies and dependencies at each layer. The blob 125 describes each workload and the order dependencies between them.

For example, typically the NN compiler 120 optimizes the executable blob 125 for a specific type of hardware device, such as, e.g., a specific type of AI accelerator (e.g., HW Dev_A 172). Thus, for example, if a different type of hardware device (e.g., selection of a new or different type of hardware device, such as HW Dev_B 174) is to be used for execution, the NN compiler 120 typically needs to be modified or changed to a version that is specifically designed to produce results for that type of hardware device.

The blob estimator 130, in conjunction with the performance simulator 140 and the power simulator 150, provides for calculating the power from a series of sub-workloads (as generated by the NN compiler 120) that form a fine-grained basis of the power estimation and, in addition, estimating the total energy by aggregating the energy from all sub-workloads. The blob estimator 130 extracts the tasks from the blob 125 and invokes the performance simulator 140 to provide performance metrics for execution of the blob 125 (representing the neural network model 110) on the selected hardware device 170. The performance metrics include the cost such as, e.g., the number of clock cycles required, or number of frames per second (e.g., frames relating to frames of an input sequence or video data), etc., the hardware utilization, and hardware efficiency. Hardware efficiency measures the relative turn-on time of the hardware, while hardware utilization measures how efficient the hardware is being utilized as the circuitry is being turned on. For example, one of the fundamental mathematical operations performed repetitively in neural networks is convolution and convolution de-composes into multiplying multiple pairs of values and accumulating their results. Hardware multiply-accumulate (MAC) arrays have often been used to support these computations, and AI accelerators often have large arrays of MACs. Thus, for MAC arrays hardware efficiency measures the relative turn-on time of the MAC array, while hardware utilization measures how efficient the MAC array is being utilized as the circuitry is being turned on.

For example, based on the breakdown of the workloads for the selected hardware device 170, the performance simulator 140 estimates (e.g., calculates) the hardware utilization (e.g., hardware utilization factor) and hardware efficiency (e.g., hardware efficiency factor). In embodiments, the hardware utilization factor and/or the hardware efficiency factor are determined on a per workload basis. This enables a determination of the power for each workload of which the neural network layer is composed, which then allows accurately estimating the total energy required for that layer. The hardware utilization and hardware efficiency are passed to the power simulator 150.

The power simulator 150 provides both per layer and average power estimations for internal and external AI hardware devices based on performance metrics from the performance simulator 140. The power estimation is provided for different nodes of a power model—each of which has a different $C_{dyn}$ constant. A node refers to hardware structure or operation that is active when performing the computations required to process the layers of a neural network. For example, a MAC array can be a node, or the on-chip SRAM memory used to store the data being processed can be a node. The power model would model the activity and power of nodes separately with certain operations being more or less costly for certain nodes, depending on whether, for example, that operation required more computation or more memory bandwidth, etc. These $C_{dyn}$ constants are populated with values based on well understood, high confidence power estimations for specific workloads, each of which is modeled differently in the performance and power simulator.

The power simulator 150 receives the hardware utilization and hardware efficiency, as determined by the performance simulator 140, and calculates the power for the given workload using the estimated hardware utilization and efficiency as a proxy for activity (A). In embodiments, the power simulator 150 provides flexible power configuration files to define various power nodes, where a power node models the power consumed in a design block or blocks on an AI accelerator. For example, a power node can have lower-level nodes (e.g., child nodes) depending on the accelerator design topology.

In embodiments, equations for calculating average power of a power node are defined as follows:

$$P_{dyn}=HW_{util}*AR*C_{dyn}*V^2*F \quad \text{EQ (2)}$$

$$P_{lkg}=P_{ref\_lkg}*f(V,T) \quad \text{EQ (3)}$$

$$P_{lkg}=C_{idle}*V^2*F \quad \text{EQ (4)}$$

$$P_{node}=P_{dyn}+P_{lkg}+P_{idle} \quad \text{EQ (5)}$$

where the parameters and variables are identified as follows:

| Name | Description |
|---|---|
| F | Power node running frequency |
| V | Voltage |
| AR | Workload application ratio |
| $HW_{util}$ | Hardware utilization |
| $HW_{eff}$ | Hardware efficiency |
| $C_{dyn}$ | Transistor switching capacitance |
| $C_{idle}$ | Idle capacitance |
| T | Junction temperature |
| $P_{dyn}$ | Dynamic power |
| $P_{lkg}$ | Leakage power |
| $P_{ref\_lkg}$ | Leakage power in typical condition (85C, TT) |

-continued

| Name | Description |
|---|---|
| $P_{idle}$ | Idle power |
| $P_{node}$ | Total power of a node |
| f(V,T) | function of Voltage (V) and temperature (T). |

Thus, the reference leakage is scaled by a factor f(V,T) that is a function of Voltage (V) and temperature (T). This is generally a non-linear scale factor which is empirically characterized for a particular silicon process. Typically f(V, T) can be implemented by a 2 dimensional look-up table indexed by V and T. Not only is power estimated with $C_{dyn}$ and leakages, the power simulator 150 also factors in hardware utilization and hardware efficiency for each workload to increase its accuracy and is able to run many fine-grained workloads and generate per workload power numbers instead of an average power in a short run time. In embodiments, equations for estimating power per workload are defined as follows (with reference to the above-listed parameters and variables):

$$P_{dyn}(WL)=HW_{eff}(WL)*HW_{util}(WL)*AR*C_{dyn}*V^2*F \quad \text{EQ (6)}$$

$$P_{lkg}=P_{ref\_lkg}*f(V,T) \quad \text{EQ (7)}$$

$$P_{idle}=C_{idle}*V^2*F \quad \text{EQ (8)}$$

$$P_{node}=P_{dyn}(WL)+P_{lkg}+P_{idle} \quad \text{EQ (9)}$$

where $P_{dyn}$(WL) is the estimated dynamic power for the given workload, $HW_{eff}$(WL) is the determined hardware efficiency for the given workload, and $HW_{util}$(WL) is the determined hardware utilization for the given workload. In embodiments a hardware efficiency factor is determined based on the hardware efficiency measurement and the hardware utilization measurement. In some embodiments similar equations can be defined with alternative parameters and variables. For example, the equations can use a single hardware efficiency factor that is based on the hardware efficiency measurement, on the hardware efficiency measurement and the hardware utilization measurement, or on another hardware efficiency metric. Per these or similar power equations, the power simulator 150 generates power estimates for all nodes with detailed power breakdowns per node, providing a greatly detailed power profile per workload. By splitting each network layer into multiple workloads, the hardware utilization and hardware efficiency are more readily assessed, and the power estimation is more fine-grained. Therefore, the estimated power is more accurate with the least run time.

In one example, a NN model 110 has a layer, res3a branchl, which belongs to the model ResNet-50. This example layer has a workload of tensor shape [28, 28, 512] (undivided workload). In the example, the NN compiler 120 breaks that workload into 4 tiles of [28, 7, 512]. Subsequently, the NN compiler 120 splits each tile into 7 sub-workloads of [4, 4, 512] (Group A) and 7 sub-workloads of [4, 3, 512] (Group B). The sub-workloads for an example tile are illustrated in the following Table:

TABLE 1

| Group A | Group B | |
|---|---|---|
| [4, 4, 512] | [4, 3, 512] | ↑ |
| [4, 4, 512] | [4, 3, 512] | |
| [4, 4, 512] | [4, 3, 512] | |
| [4, 4, 512] | [4, 3, 512] | 28 |
| [4, 4, 512] | [4, 3, 512] | |
| [4, 4, 512] | [4, 3, 512] | |
| [4, 4, 512] | [4, 3, 512] | ↓ |
| ← 7 → | | |

Using a conventional average power approach over the undivided workload of tensor shape [28, 28, 512], the average power calculated from the conventional method for this example, with no hardware efficiency factor, is 166.3 mW. After the workload is broken into tiles and each tile is further sub-divided into 7 sub-workloads of [4, 4, 512] (Group A) and 7 sub-workloads of [4, 3, 512] (Group A) (as illustrated in Table 1), the hardware efficiency factor in this example is determined to be 87.5%, and the power number for the workload is estimated as 146.1 mW. Accordingly, as illustrated by this example, using the techniques as described herein results in a more accurate power estimation.

Moreover, the power simulator 150 provides configuration files that enable users to define voltage and frequency maps for various power nodes. For example, discrete voltage-frequency (V-F) points and exponential V-F curves are supported. The power simulator 150 further provides built-in equations to calculate dynamic power, leakage power and idle power of the power nodes. Thus, for each power node, users can define "frequency", "number of instances", "$C_{dyn}$", "idle $C_{dyn}$", and other parameters in the power configuration, and the power simulator 150 automatically links "frequency", "number of instances", "utilization" and "read/write bandwidth" to performance metrics derived from the performance simulator 140 to generate a power profile.

FIG. 2 provides a diagram of sample code illustrating generation of an example power configuration file 200 according to one or more embodiments, with reference to components and features described herein including but not limited to the figures and associated description. The code in FIG. 2 provides an example of generic power nodes, the definition of leakage and $C_{dyn}$ constants for those nodes and how they can be hierarchically composed (with child nodes).

Returning now to FIG. 1, in embodiments the blob estimator 130, the performance simulator 140 and the power simulator 150 are in data communication with each other such that data, commands, queries, etc. can be passed between and among each of these units. In embodiments, the blob estimator 130, the performance simulator 140 and the power simulator 150 are arranged in a hierarchical manner such that data, commands, queries, etc. can be passed, e.g., between the blob estimator 130 and the performance simulator 140, and also between the performance simulator 140 and the power simulator 150. Other embodiments can include a variety of arrangements of these components, including the sharing of functionality among the components or incorporating functionality of one component into another.

The output unit 160 receives performance and power estimates from the blob estimator 130, e.g., as provided via the performance simulator 140 and the power simulator 150). As an example, the power per workload, once estimated, can be written to a profile file which describes the performance (the time a given workload took to execute) and the power consumed for each workload. In some embodiments, the performance and power estimates are provided to the output unit 160 via a function (not shown in FIG. 1) to organize or format the data in a form that can be more readily sorted, analyzed and/or presented with available tools. As one example, data from the blob estimator 130 can be converted into serialized data using JSON (Javascript object notation). In embodiments, the output unit 160 also receives high-level information about the blob 125 from the NN compiler 120. For example, the information about blob 125 includes information such as workloads, parameters or configuration of each workload (operation, input tensor, output tensor) and dependencies. The workloads and their dependencies together can represent the schedule, the order in which the workloads must be dispatched and executed.

Based on the received information, the output unit 160 determines metrics and provides fine-grained results, e.g., a performance profile—including, e.g., key performance index (KPI) measurements, and/or a power profile—including, e.g., power measurements. The performance profile provides, e.g., workload performance with separate timelines for different types of tasks and/or instances of computation engines. The power profile provides, e.g., estimated power consumption for workloads across a similar timeline.

Figure 3A:
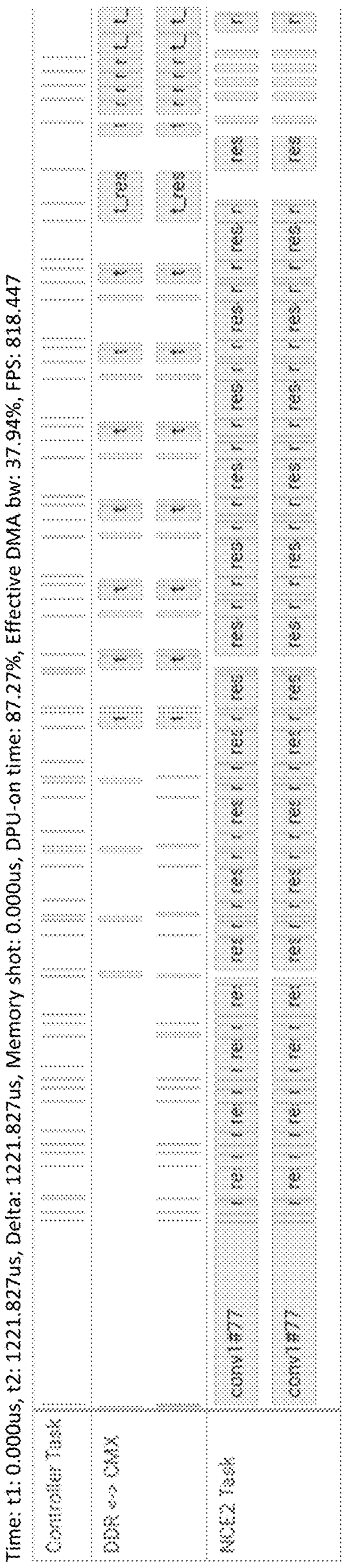
FIGS. 3A-3D provide examples of visualization graphs according to one or more embodiments.
Figure 3B:
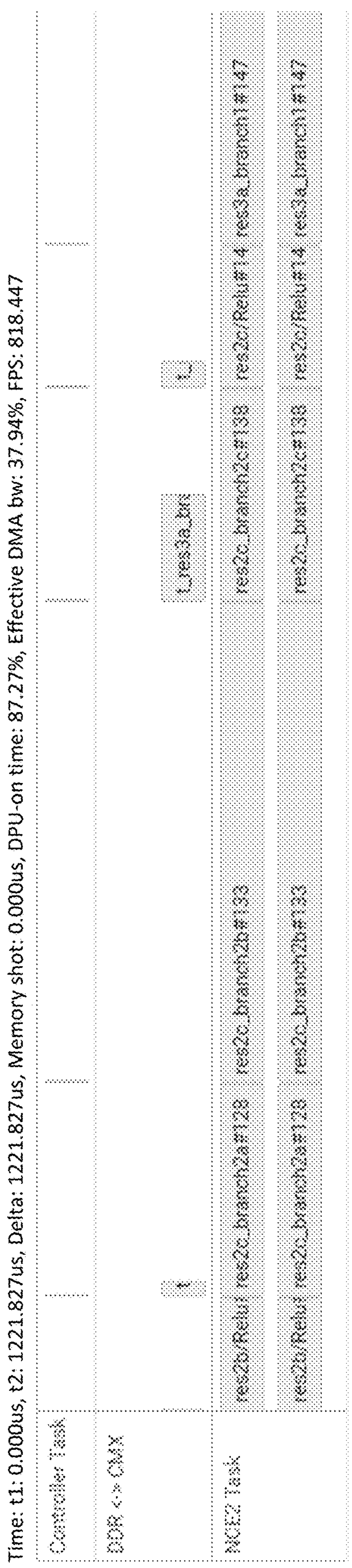

In embodiments, the output unit 160 includes a visualizer 162. The visualizer 162 generates visual fine-grained output—for example, in the form of a graph—of the performance profile and/or the power profile. FIGS. 3A-3D provide examples of visualization graphs according to one or more embodiments, with reference to components and features described herein including but not limited to the figures and associated description. Turning to FIG. 3A, shown is an example of a performance profile graph 300, where the performance profile is shown in terms of execution time, with separate timelines for different types of tasks and/or instances of computation engines. An expanded view 325 of a portion of the example performance profile graph is shown in FIG. 3B. The timeline is represented in terms of milliseconds (MS). For example, the top row of FIG. 3A shows the performance for a controller task (e.g., a CPU interrogating the schedule and dispatching workloads for execution on the computational units, or DMA tasks). The second row shows the performance for Direct Memory Access (DMA) tasks moving data from external memory into the accelerator's internal memory array (DDR refers to dual data rate dynamic random access memory, which in examples serves as main computing system memory). The bottom two rows show performance for two computational tasks for the neural network executed in parallel on the AI accelerator under test, where each block indicates a separate workload.

Figure 3C:
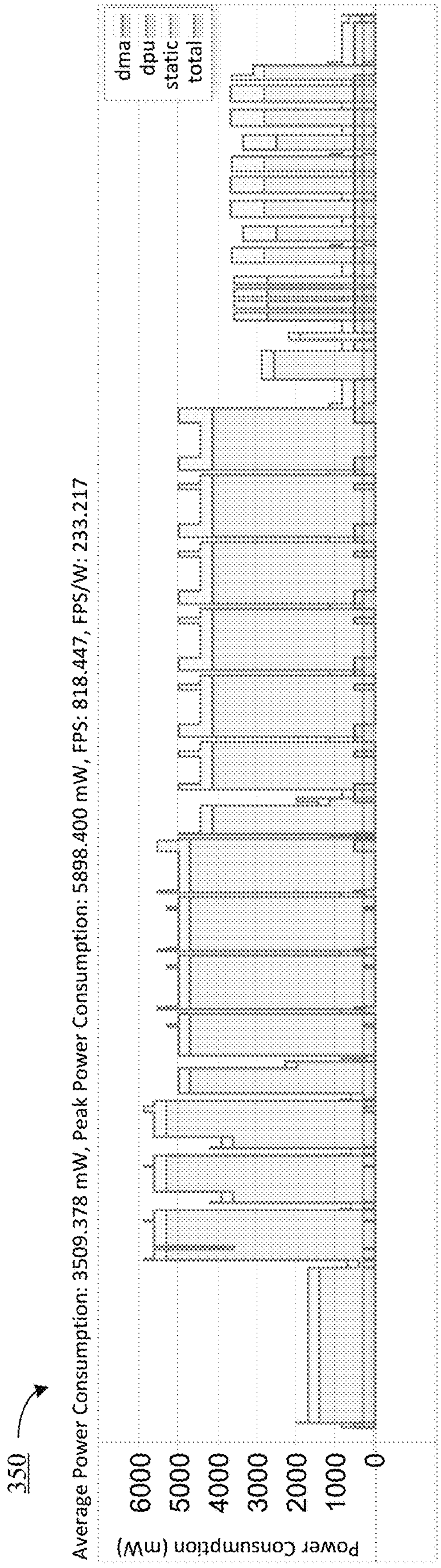
Figure 3D:
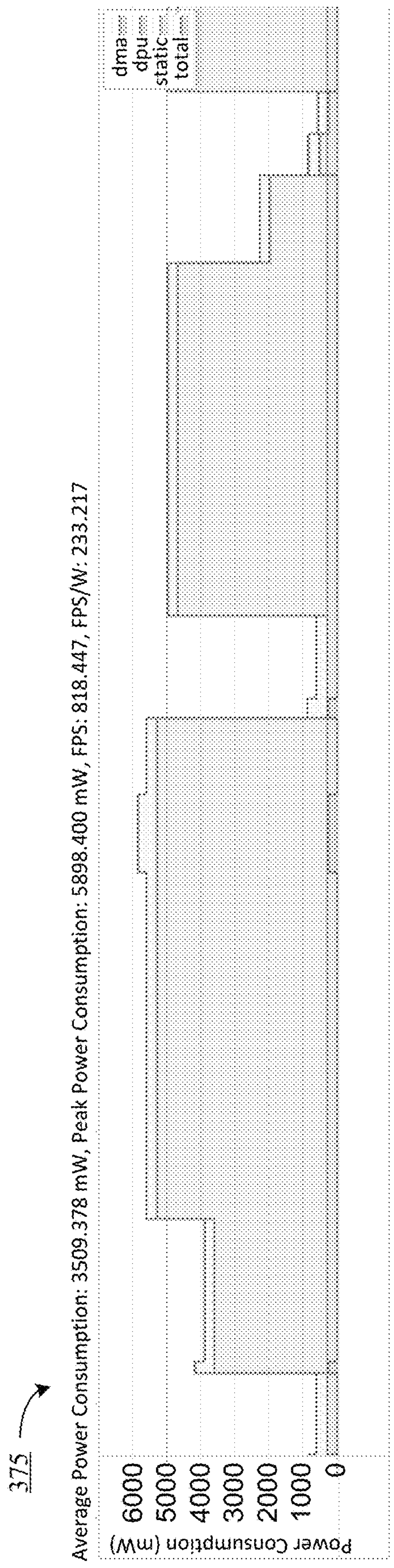

Turning now to FIG. 3C, shown is an example of a power profile graph 350, where the power profile is shown in terms of a reference time sequence (similar to the reference time sequence of FIG. 3A). An expanded view 375 of a portion of the example power profile graph is shown in FIG. 3B. The graph 350 displays individual timelines for estimated power for DMA processing (e.g., moving data in and out of the AI accelerator); data processing unit (DPU) processing (e.g., processing, by the AI accelerator, of tensor data, including convolutions); and static power (e.g., no processing occurs, but the clock signal is generated which consumes power). Average power is shown above the graph. The graph 350 also displays a line showing the total estimated power (e.g., sum of DMA power, DPU power and static power). The visualizer 162 can also display average power across the timeline. As illustrated in the example graph 350, the estimated power consumption can vary widely as the NN executes. Further, various peaks in power consumption can be identified. For example, in embodiments the peaks are used to identify when the peak power exceeds a power limitation or threshold. As shown in comparing Ms. 3A-3B with FIGS. 3C-3D, there are correlations between the workloads in FIGS. 3A-3B and the power profile in FIGS. 3C-3D. For example, where there are concurrent tasks in FIGS. 3A-3B that are corresponding peaks in the power profile in FIGS. 3C-3D.

Returning now to FIG. 1, In embodiments, the output unit 160 includes a feedback unit 164. The feedback unit 164 generates performance and power feedback information, based on the per-layer or per-workload power estimates, to be used in one or more various ways. In embodiments, the feedback unit 164 provides information to identify those device(s) under test (e.g., one of the devices 170) that perform better in terms of power profiling and/or performance profiling that other devices (e.g., another of the devices 170). For example, such feedback information is used to select a better-performing device for implementing the neural network for inference. In embodiments, the feedback unit 164 provides information to identify changes in the neural network model 110 and/or the NN compiler 120. For example, such feedback information is used to optimize the breakdown of workloads by the compiler into tasks that reduce power spikes or average power consumed. As another example, such feedback information is used to optimize scheduling of tasks by the compiler to be performed by the hardware device. In embodiments, the feedback unit 164 provides information to confirm the design of a device 170. For example, such feedback information is used to confirm that any power spikes fall within acceptable parameters (such as, e.g., below a threshold power level).

Some or all components in the system 100 can be implemented using one or more of a central processing unit (CPU), a graphics processing unit (GPU), an artificial intelligence (AI) accelerator, a field programmable gate array (FPGA) accelerator, an application specific integrated circuit (ASIC), and/or via a processor with software, or in a combination of a processor with software and an FPGA or ASIC. More particularly, components of the system 100 can be implemented in one or more modules as a set of program or logic instructions stored in a machine- or computer-readable storage medium such as random access memory (RAM), read only memory (ROM), programmable ROM (PROM), firmware, flash memory, etc., in hardware, or any combination thereof. For example, hardware implementations can include configurable logic, fixed-functionality logic, or any combination thereof. Examples of configurable logic include suitably configured programmable logic arrays (PLAs), FPGAs, complex programmable logic devices (CPLDs), and general purpose microprocessors. Examples of fixed-functionality logic include suitably configured ASICs, combinational logic circuits, and sequential logic circuits. The configurable or fixed-functionality logic can be implemented with complementary metal oxide semiconductor (CMOS) logic circuits, transistor-transistor logic (TTL) logic circuits, or other circuits.

For example, computer program code to carry out operations by the system 100 can be written in any combination of one or more programming languages, including an object oriented programming language such as JAVA, SMALLTALK, C++ or the like and conventional procedural programming languages, such as the "C" programming language or similar programming languages. Additionally, program or logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

FIG. 4 provides a flow chart illustrating an example method 400 of generating a power profile for a neural network according to one or more embodiments, with reference to components and features described herein including but not limited to the figures and associated description. The method 400 can generally be implemented in the system 100 (FIG. 1, already discussed) and/or via components of the system 100, such as, e.g., the blob estimator 130, the performance simulator 140 and/or the power simulator 150. More particularly, the method 400 can be implemented as one or more modules as a set of logic instructions stored in a machine- or computer-readable storage medium such as RAM, ROM, PROM, firmware, flash memory, etc., in hardware, or any combination thereof. For example, hardware implementations can include configurable logic, fixed-functionality logic, or any combination thereof. Examples of configurable logic include suitably configured PLAs, FPGAs, CPLDs, and general purpose microprocessors. Examples of fixed-functionality logic include suitably configured ASICs, combinational logic circuits, and sequential logic circuits. The configurable or fixed-functionality logic can be implemented with CMOS logic circuits, TTL logic circuits, or other circuits.

For example, computer program code to carry out operations shown in the method 400 can be written in any combination of one or more programming languages, including an object oriented programming language such as JAVA, SMALLTALK, C++ or the like and conventional procedural programming languages, such as the "C" programming language or similar programming languages. Additionally, program or logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 410 provides for obtaining a plurality of workloads for a compiled neural network (NN) model, where at block 410*a* the plurality of workloads are determined for a hardware execution device. Illustrated processing block 420 provides for determining a hardware efficiency factor for the compiled NN model. In some embodiments, at block 420*a* the hardware efficiency factor is determined on based on a hardware efficiency measurement and a hardware utilization measurement. In some embodiments, at block 420*b* the hardware efficiency factor is determined on a per-workload basis. Illustrated processing block 430 provides for generating, based on the hardware efficiency factor, a power profile for the compiled NN model on one or more of a per-layer basis or a per-workload basis.

In some embodiments, the method 400 includes, at processing block 440, providing a configuration file to be used for generating the power profile. In some embodiments, the method 400 includes, at processing block 450, generating an output visualization of the power profile. In some embodiments, the visualization includes a power profile graph. In some embodiments, a performance profile graph is also generated. In some embodiments, the method 400 includes, at processing block 460, generating feedback information to perform one or more of selecting a hardware device, optimizing a breakdown of workloads, optimizing a scheduling of tasks, or confirming a hardware device design.

Embodiments of each of the above systems, devices, components and/or methods, including the system 100 (or any components thereof), the process 400, and/or any other system components, can be implemented in hardware, software, or any suitable combination thereof. For example, hardware implementations can include configurable logic, fixed-functionality logic, or any combination thereof. Examples of configurable logic include suitably configured PLAs, FPGAs, CPLDs, and general purpose microprocessors. Examples of fixed-functionality logic include suitably configured ASICs, combinational logic circuits, and sequential logic circuits. The configurable or fixed-functionality logic can be implemented with CMOS logic circuits, TTL logic circuits, or other circuits. For example, embodiments of each of the above systems, devices, components and/or methods can be implemented via the system 10 (FIG. 5, discussed further below), the semiconductor apparatus 30 (FIG. 6, discussed further below), the processor 40 (FIG. 7, discussed further below), and/or the computing system 60 (FIG. 8, discussed further below).

Alternatively, or additionally, all or portions of the foregoing systems and/or devices and/or components and/or methods can be implemented in one or more modules as a set of program or logic instructions stored in a machine- or computer-readable storage medium such as RAM, ROM, PROM, firmware, flash memory, etc., to be executed by a processor or computing device. For example, computer program code to carry out the operations of the components can be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages.

Figure 5:
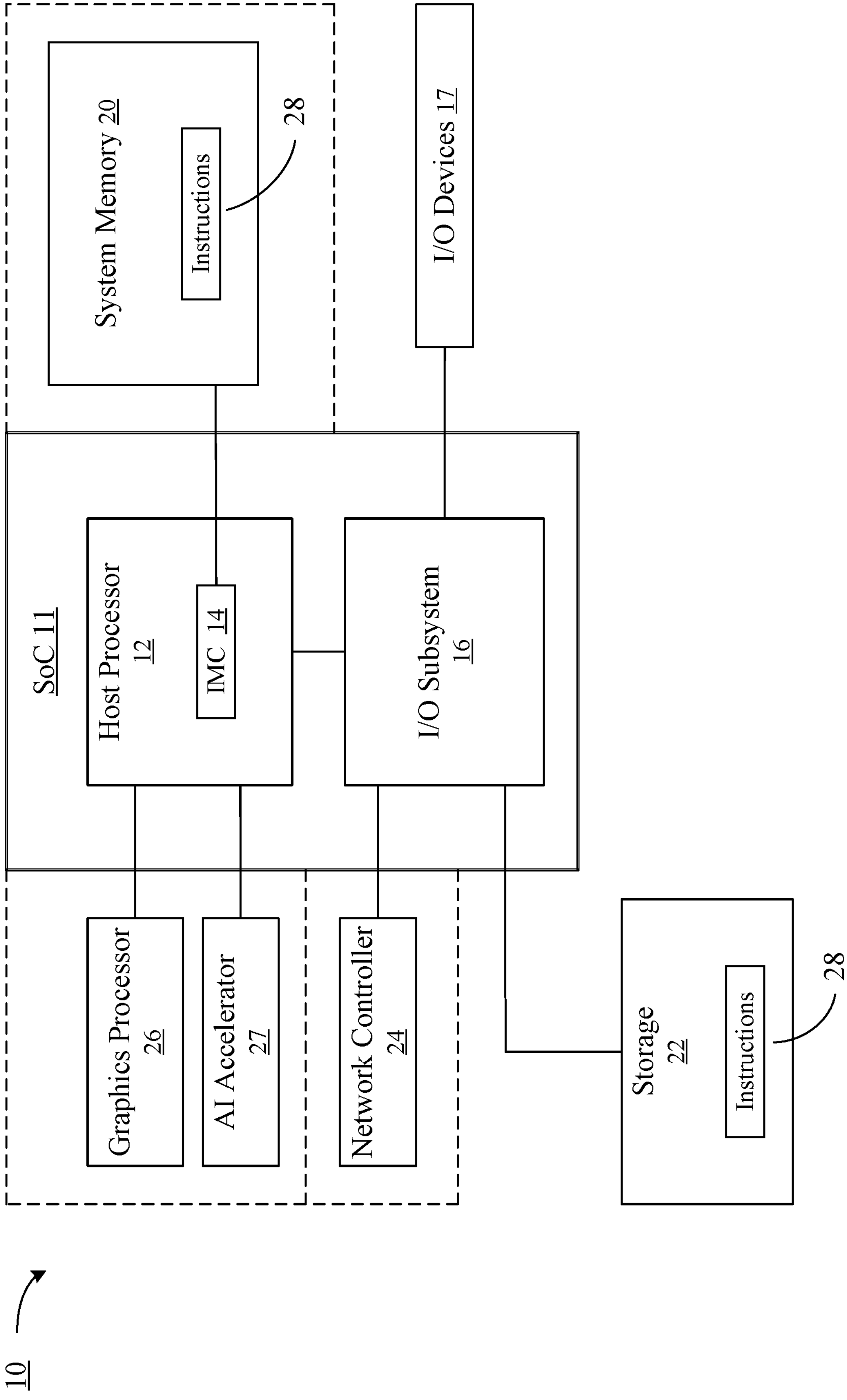
FIG. 5 is a block diagram illustrating an example computing system for neural network power profile estimation according to one or more embodiments.

FIG. 5 shows a block diagram illustrating an example computing system 10 for estimating power profiles for neural networks according to one or more embodiments, with reference to components and features described herein including but not limited to the figures and associated description. The system 10 can generally be part of an electronic device/platform having computing and/or communications functionality (e.g., server, cloud infrastructure controller, database controller, notebook computer, desktop computer, personal digital assistant/PDA, tablet computer, convertible tablet, smart phone, etc.), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), Internet of Things (IoT) functionality, etc., or any combination thereof. In the illustrated example, the system 10 can include a host processor 12 (e.g., central processing unit/CPU) having an integrated memory controller (WIC) 14 that can be coupled to system memory 20. The host processor 12 can include any type of processing device, such as, e.g., microcontroller, microprocessor, RISC processor, ASIC, etc., along with associated processing modules or circuitry. The system memory 20 can include any non-transitory machine- or computer-readable storage medium such as RAM, ROM, PROM, EEPROM, firmware, flash memory, etc., configurable logic such as, for example, PLAs, FPGAs, CPLDs, fixed-functionality hardware logic using circuit technology such as, for example, ASIC, CMOS or TTL technology, or any combination thereof suitable for storing instructions 28.

The system 10 can also include an input/output (I/O) subsystem 16. The I/O subsystem 16 can communicate with for example, one or more input/output (I/O) devices 17, a network controller 24 (e.g., wired and/or wireless NIC), and storage 22. The storage 22 can be comprised of any appropriate non-transitory machine- or computer-readable memory type (e.g., flash memory, DRAM, SRAM (static random access memory), solid state drive (SSD), hard disk drive (HDD), optical disk, etc.). The storage 22 can include mass storage. In some embodiments, the host processor 12 and/ or the I/O subsystem 16 can communicate with the storage 22 (all or portions thereof) via a network controller 24. In some embodiments, the system 10 can also include a graphics processor 26 (e.g., a graphics processing unit/GPU and/or an AI accelerator 27. In an embodiment, the system 10 can also include a vision processing unit (VPU), not shown.

The host processor 12 and the I/O subsystem 16 can be implemented together on a semiconductor die as a system on chip (SoC) 11, shown encased in a solid line. The SoC 11 can therefore operate as a computing apparatus for estimating power profiles for neural networks. In some embodiments, the SoC 11 can also include one or more of the system memory 20, the network controller 24, and/or the graphics processor 26 (shown encased in dotted lines). In some embodiments, the SoC 11 can also include other components of the system 10.

The host processor 12 and/or the I/O subsystem 16 can execute program instructions 28 retrieved from the system memory 20 and/or the storage 22 to perform one or more aspects of process 400 as described herein with reference to FIG. 4. The system 10 can implement one or more aspects or components of the system 100 as described herein with reference to FIG. 1. The system 10 is therefore considered to be performance-enhanced at least to the extent that the technology provides the ability to measure or estimate power consumption in neural networks on a workload by workload basis or a layer by layer basis, and further enhanced by taking hardware efficiency into consideration.

Computer program code to carry out the processes described above can be written in any combination of one or more programming languages, including an object-oriented programming language such as JAVA, JAVASCRIPT, PYTHON, SMALLTALK, C++ or the like and/or conventional procedural programming languages, such as the "C" programming language or similar programming languages, and implemented as program instructions 28. Additionally, program instructions 28 can include assembler instructions, instruction set architecture (ISA) instructions, machine instructions, machine dependent instructions, microcode, state-setting data, configuration data for integrated circuitry, state information that personalizes electronic circuitry and/ or other structural components that are native to hardware (e.g., host processor, central processing unit/CPU, microcontroller, microprocessor, etc.).

I/O devices 17 can include one or more of input devices, such as a touch-screen, keyboard, mouse, cursor-control device, touch-screen, microphone, digital camera, video recorder, camcorder, biometric scanners and/or sensors; input devices can be used to enter information and interact with system 10 and/or with other devices. The I/O devices 17 can also include one or more of output devices, such as a display (e.g., touch screen, liquid crystal display/LCD, light emitting diode/LED display, plasma panels, etc.), speakers and/or other visual or audio output devices. The input and/or output devices can be used, e.g., to provide a user interface.

Figure 6:
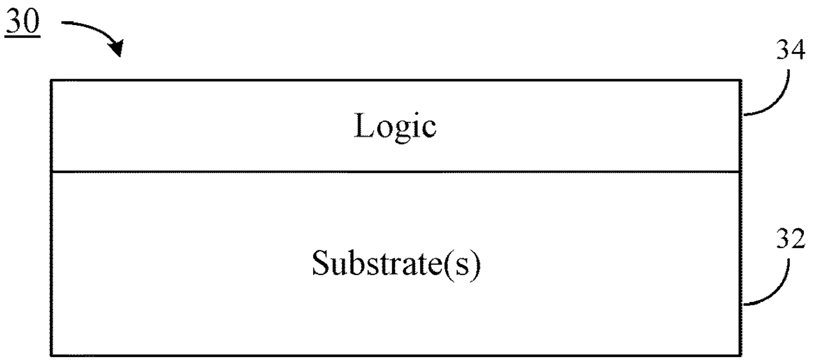
FIG. 6 is a block diagram illustrating an example semiconductor apparatus according to one or more embodiments.

FIG. 6 shows a block diagram illustrating an example semiconductor apparatus 30 for estimating power profiles for neural networks according to one or more embodiments, with reference to components and features described herein including but not limited to the figures and associated description. The semiconductor apparatus 30 can be implemented, e.g., as a chip, die, or other semiconductor package. The semiconductor apparatus 30 can include one or more substrates 32 comprised of, e.g., silicon, sapphire, gallium arsenide, etc. The semiconductor apparatus 30 can also include logic 34 comprised of, e.g., transistor array(s) and other integrated circuit (IC) components) coupled to the substrate(s) 32. The logic 34 can be implemented at least partly in configurable logic or fixed-functionality logic hardware. The logic 34 can implement the system on chip (SoC) 11 described above with reference to FIG. 5. The logic 34 can implement one or more aspects of the processes described above, including process 400. The logic 34 can implement one or more aspects or components of the system 100 as described herein with reference to FIG. 1. The apparatus 30 is therefore considered to be performance-enhanced at least to the extent that the technology provides the ability to measure or estimate power consumption in neural networks on a workload by workload basis or a layer by layer basis, and further enhanced by taking hardware efficiency into consideration.

The semiconductor apparatus 30 can be constructed using any appropriate semiconductor manufacturing processes or techniques. For example, the logic 34 can include transistor channel regions that are positioned (e.g., embedded) within the substrate(s) 32. Thus, the interface between the logic 34 and the substrate(s) 32 may not be an abrupt junction. The logic 34 can also be considered to include an epitaxial layer that is grown on an initial wafer of the substrate(s) 34.

Figure 7:
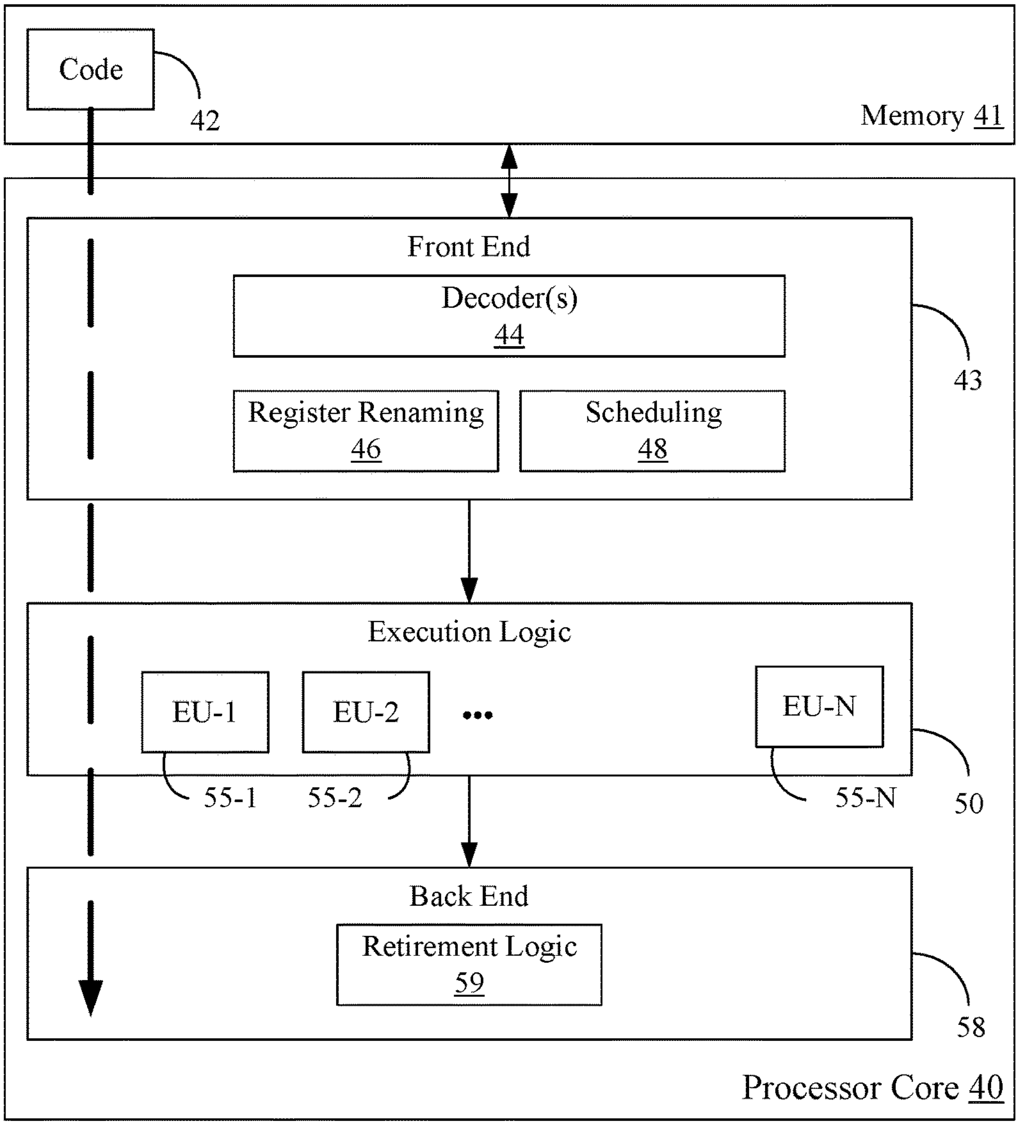
FIG. 7 is a block diagram illustrating an example processor according to one or more embodiments.
Figure 8:
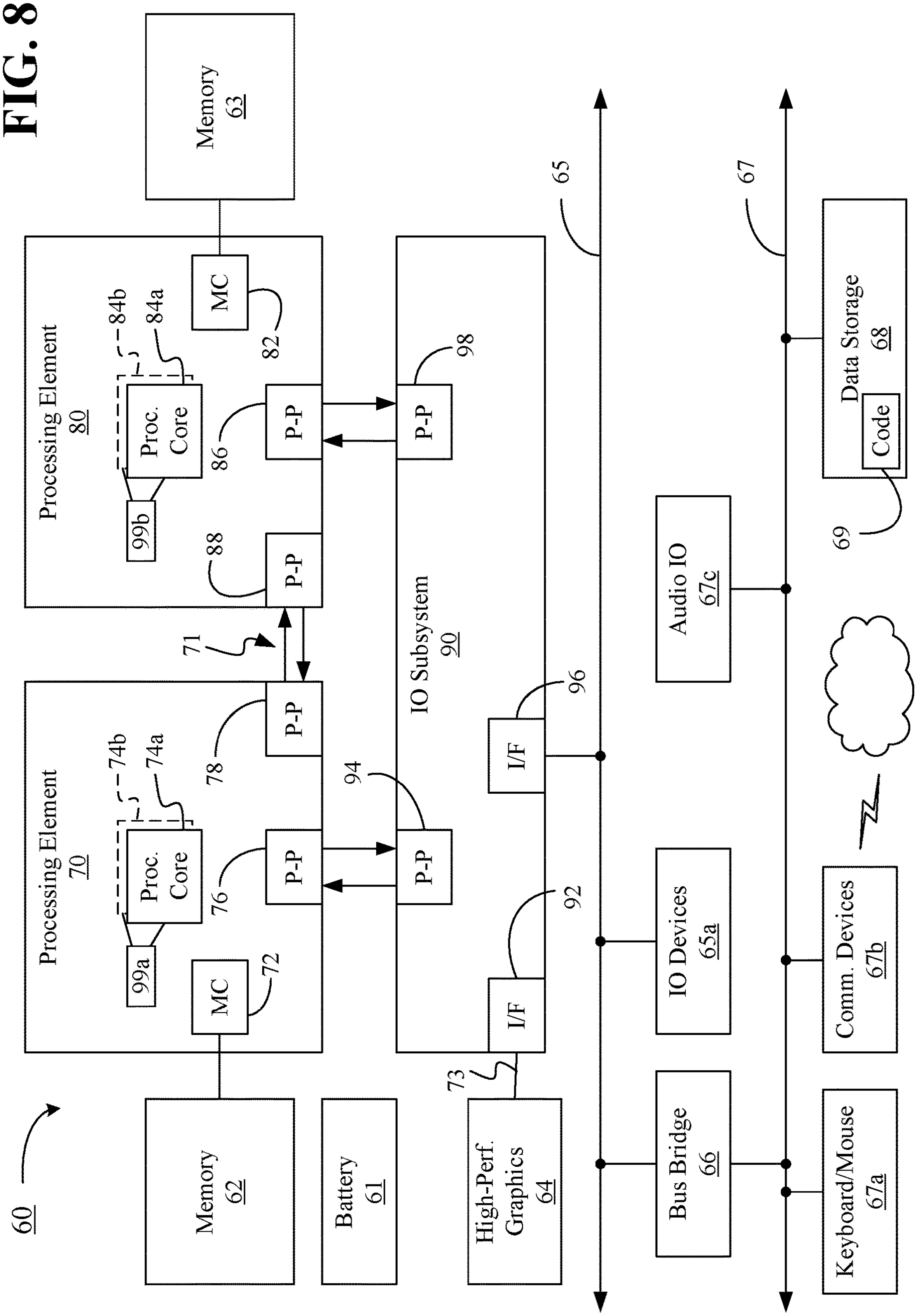
FIG. 8 is a block diagram illustrating an example of a multiprocessor-based computing system according to one or more embodiments.

FIG. 7 is a block diagram illustrating an example processor core 40 according to one or more embodiments, with reference to components and features described herein including but not limited to the figures and associated description. The processor core 40 can be the core for any type of processor, such as a micro-processor, an embedded processor, a digital signal processor (DSP), a network processor, a graphics processing unit (GPU), or other device to execute code. Although only one processor core 40 is illustrated in FIG. 7, a processing element can alternatively include more than one of the processor core 40 illustrated in FIG. 7. The processor core 40 can be a single-threaded core or, for at least one embodiment, the processor core 40 can be multithreaded in that it can include more than one hardware thread context (or "logical processor") per core.

FIG. 7 also illustrates a memory 41 coupled to the processor core 40. The memory 41 can be any of a wide variety of memories (including various layers of memory hierarchy) as are known or otherwise available to those of skill in the art. The memory 41 can include one or more code 42 instruction(s) to be executed by the processor core 40. The code 42 can implement one or more aspects of the process 400 described above. The processor core 40 can implement one or more aspects or components of the system 100 as described herein with reference to FIG. 1. The processor core 40 can follow a program sequence of instructions indicated by the code 42. Each instruction can enter a front end portion 43 and be processed by one or more decoders 44. The decoder 44 can generate as its output a micro operation such as a fixed width micro operation in a predefined format, or can generate other instructions, microinstructions, or control signals which reflect the original code instruction. The illustrated front end portion 43 also includes register renaming logic 46 and scheduling logic 48, which generally allocate resources and queue the operation corresponding to the convert instruction for execution.

The processor core 40 is shown including execution logic 50 having a set of execution units 55-1 through 55-N. Some embodiments can include a number of execution units dedicated to specific functions or sets of functions. Other embodiments can include only one execution unit or one execution unit that can perform a particular function. The illustrated execution logic 50 performs the operations specified by code instructions.

After completion of execution of the operations specified by the code instructions, back end logic 58 retires the instructions of code 42. In one embodiment, the processor core 40 allows out of order execution but requires in order retirement of instructions. Retirement logic 59 can take a variety of forms as known to those of skill in the art (e.g., re-order buffers or the like). In this manner, the processor core 40 is transformed during execution of the code 42, at least in terms of the output generated by the decoder, the hardware registers and tables utilized by the register renaming logic 46, and any registers (not shown) modified by the execution logic 50.

Although not illustrated in FIG. 7, a processing element can include other elements on chip with the processor core 40. For example, a processing element can include memory control logic along with the processor core 40. The processing element can include I/O control logic and/or can include I/O control logic integrated with memory control logic. The processing element can also include one or more caches.

FIG. 8 is a block diagram illustrating an example of a multi-processor based computing system 60 according to one or more embodiments, with reference to components and features described herein including but not limited to the figures and associated description. The multiprocessor system 60 includes a first processing element 70 and a second processing element 80. While two processing elements 70 and 80 are shown, it is to be understood that an embodiment of the system 60 can also include only one such processing element.

The system 60 is illustrated as a point-to-point interconnect system, wherein the first processing element 70 and the second processing element 80 are coupled via a point-to-point interconnect 71. It should be understood that any or all of the interconnects illustrated in FIG. 8 can be implemented as a multi-drop bus rather than point-to-point interconnect.

As shown in FIG. 8, each of the processing elements 70 and 80 can be multicore processors, including first and second processor cores (i.e., processor cores 74*a* and 74*b* and processor cores 84*a* and 84*b* ). Such cores 74*a* , 74*b* , 84*a* , 84*b* can be configured to execute instruction code in a manner similar to that discussed above in connection with FIG. 7.

Each processing element 70, 80 can include at least one shared cache 99*a* , 99*b* . The shared cache 99*a* , 99*b* can store data (e.g., instructions) that are utilized by one or more components of the processor, such as the cores 74*a* , 74*b* and 84*a* , 84*b* , respectively. For example, the shared cache 99*a* , 99*b* can locally cache data stored in a memory 62, 63 for faster access by components of the processor. In one or more embodiments, the shared cache 99*a* , 99*b* can include one or more mid-level caches, such as level 2 (L2), level 3 (L3), level 4 (L4), or other levels of cache, a last level cache (LLC), and/or combinations thereof.

While shown with only two processing elements 70, 80, it is to be understood that the scope of the embodiments is not so limited. In other embodiments, one or more additional processing elements can be present in a given processor. Alternatively, one or more of the processing elements 70, 80 can be an element other than a processor, such as an accelerator or a field programmable gate array. For example, additional processing element(s) can include additional processors(s) that are the same as a first processor 70, additional processor(s) that are heterogeneous or asymmetric to processor a first processor 70, accelerators (such as, e.g., graphics accelerators or digital signal processing (DSP) units), field programmable gate arrays, or any other processing element. There can be a variety of differences between the processing elements 70, 80 in terms of a spectrum of metrics of merit including architectural, micro architectural, thermal, power consumption characteristics, and the like. These differences can effectively manifest themselves as asymmetry and heterogeneity amongst the processing elements 70, 80. For at least one embodiment, the various processing elements 70, 80 can reside in the same die package.

The first processing element 70 can further include memory controller logic (MC) 72 and point-to-point (P-P) interfaces 76 and 78. Similarly, the second processing element 80 can include a MC 82 and P-P interfaces 86 and 88. As shown in FIG. 8, MC's 72 and 82 couple the processors to respective memories, namely a memory 62 and a memory 63, which can be portions of main memory locally attached to the respective processors. While the MC 72 and 82 is illustrated as integrated into the processing elements 70, 80, for alternative embodiments the MC logic can be discrete logic outside the processing elements 70, 80 rather than integrated therein.

The first processing element 70 and the second processing element 80 can be coupled to an I/O subsystem 90 via P-P interconnects 76 and 86, respectively. As shown in FIG. 8, the I/O subsystem 90 includes P-P interfaces 94 and 98. Furthermore, the I/O subsystem 90 includes an interface 92 to couple I/O subsystem 90 with a high performance graphics engine 64. In one embodiment, a bus 73 can be used to couple the graphics engine 64 to the I/O subsystem 90. Alternately, a point-to-point interconnect can couple these components.

In turn, the I/O subsystem 90 can be coupled to a first bus 65 via an interface 96. In one embodiment, the first bus 65 can be a Peripheral Component Interconnect (PCI) bus, or a bus such as a PCI Express bus or another third generation I/O interconnect bus, although the scope of the embodiments are not so limited.

As shown in FIG. 8, various I/O devices 65*a* (e.g., biometric scanners, speakers, cameras, and/or sensors) can be coupled to the first bus 65, along with a bus bridge 66 which can couple the first bus 65 to a second bus 67. In one embodiment, the second bus 67 can be a low pin count (LPC) bus. Various devices can be coupled to the second bus 67 including, for example, a keyboard/mouse 67*a* , communication device(s) 67*b* , and a data storage unit 68 such as a disk drive or other mass storage device which can include code 69, in one embodiment. The illustrated code 69 can implement one or more aspects of the processes described above, including the process 400. The illustrated code 69 can be similar to the code 42 (FIG. 7), already discussed. Further, an audio I/O 67*c* can be coupled to second bus 67 and a battery 61 can supply power to the computing system 60. The system 60 can implement one or more aspects or components of the system 100 as described herein with reference to FIG. 1.

Note that other embodiments are contemplated. For example, instead of the point-to-point architecture of FIG. 8, a system can implement a multi-drop bus or another such communication topology. Also, the elements of FIG. 8 can alternatively be partitioned using more or fewer integrated chips than shown in FIG. 8.

ADDITIONAL NOTES AND EXAMPLES

Example 1 includes a performance-enhanced computing system comprising a processor, and memory coupled to the processor, the memory to store instructions which, when executed by the processor, cause the computing system to obtain a plurality of workloads for a compiled neural network (NN) model, the plurality of workloads determined for a hardware execution device, determine a hardware efficiency factor for the compiled NN model, and generate, based on the hardware efficiency factor, a power profile for the compiled NN model on one or more of a per-layer basis or a per-workload basis.

Example 2 includes the computing system of Example 1, wherein the hardware efficiency factor is determined on based on a hardware efficiency measurement and a hardware utilization measurement.

Example 3 includes the computing system of Example 1, wherein the hardware efficiency factor is determined on a per-workload basis.

Example 4 includes the computing system of Example 1, wherein the instructions, when executed, further cause the computing system to provide a configuration file to be used for generating the power profile.

Example 5 includes the computing system of Example 1, wherein the instructions, when executed, further cause the computing system to generate an output visualization of the power profile.

Example 6 includes the computing system of any one of Examples 1 to 5, wherein the instructions, when executed, further cause the computing system to generate feedback information to perform one or more of selecting a hardware device, optimizing a breakdown of workloads, optimizing a scheduling of tasks, or confirming a hardware device design.

Example 7 includes a semiconductor apparatus comprising one or more substrates, and logic coupled to the one or more substrates, wherein the logic is implemented at least partly in one or more of configurable logic or fixed-functionality hardware logic, the logic to obtain a plurality of workloads for a compiled neural network (NN) model, the plurality of workloads determined for a hardware execution device, determine a hardware efficiency factor for the compiled NN model, and generate, based on the hardware efficiency factor, a power profile for the compiled NN model on one or more of a per-layer basis or a per-workload basis.

Example 8 includes the apparatus of Example 7, wherein the hardware efficiency factor is determined on based on a hardware efficiency measurement and a hardware utilization measurement.

Example 9 includes the apparatus of Example 7, wherein the hardware efficiency factor is determined on a per-workload basis.

Example 10 includes the apparatus of Example 7, wherein the logic is further to provide a configuration file to be used for generating the power profile.

Example 11 includes the apparatus of Example 7, wherein the logic is further to generate an output visualization of the power profile.

Example 12 includes the apparatus of any one of Examples 7 to 11, wherein the logic is further to generate feedback information to perform one or more of selecting a hardware device, optimizing a breakdown of workloads, optimizing a scheduling of tasks, or confirming a hardware device design.

Example 13 includes the apparatus of any one of Examples 7 to 12, wherein the logic coupled to the one or more substrates includes transistor channel regions that are positioned within the one or more substrates.

Example 14 includes at least one computer readable storage medium comprising a set of instructions which, when executed by a computing system, cause the computing system to obtain a plurality of workloads for a compiled neural network (NN) model, the plurality of workloads determined for a hardware execution device, determine a hardware efficiency factor for the compiled NN model, and generate, based on the hardware efficiency factor, a power profile for the compiled NN model on one or more of a per-layer basis or a per-workload basis.

Example 15 includes the at least one computer readable storage medium of Example 14, wherein the hardware efficiency factor is determined on based on a hardware efficiency measurement and a hardware utilization measurement.

Example 16 includes the at least one computer readable storage medium of Example 14, wherein the hardware efficiency factor is determined on a per-workload basis.

Example 17 includes the at least one computer readable storage medium of Example 14, wherein the instructions, when executed, further cause the computing system to provide a configuration file to be used for generating the power profile.

Example 18 includes the at least one computer readable storage medium of Example 14, wherein the instructions, when executed, further cause the computing system to generate an output visualization of the power profile.

Example 19 includes the at least one computer readable storage medium of any one of Examples 14 to 18, wherein the instructions, when executed, further cause the computing system to generate feedback information to perform one or more of selecting a hardware device, optimizing a breakdown of workloads, optimizing a scheduling of tasks, or confirming a hardware device design.

Example 20 includes a method comprising obtaining a plurality of workloads for a compiled neural network (NN) model, the plurality of workloads determined for a hardware execution device, determining a hardware efficiency factor for the compiled NN model, and generating, based on the hardware efficiency factor, a power profile for the compiled NN model on one or more of a per-layer basis or a per-workload basis.

Example 21 includes the method of Example 20, wherein the hardware efficiency factor is determined on based on a hardware efficiency measurement and a hardware utilization measurement.

Example 22 includes the method of Example 20, wherein the hardware efficiency factor is determined on a per-workload basis.

Example 23 includes the method of Example 20, further comprising providing a configuration file to be used for generating the power profile.

Example 24 includes the method of Example 20, further comprising generating an output visualization of the power profile.

Example 25 includes the method of any one of Examples 20 to 24, further comprising generating feedback information to perform one or more of selecting a hardware device, optimizing a breakdown of workloads, optimizing a scheduling of tasks, or confirming a hardware device design.

Example 26 includes an apparatus comprising means for performing the method of any one of Examples 20 to 25.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections, including logical connections via intermediate components (e.g., device A may be coupled to device C via device B). In addition, the terms "first", "second", etc. may be used herein only to facilitate discussion, and carry no particular temporal or chronological significance unless otherwise indicated. As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system, comprising:

a processor; and memory coupled to the processor, the memory to store instructions which, when executed by the processor, cause the computing system to:

obtain a plurality of workloads for a compiled neural network (NN) model, the plurality of workloads determined for a hardware execution device, determine hardware efficiency factors and hardware utilization factors for the plurality of workloads, a pair of a hardware efficiency factor and a hardware utilization factor determined for to a workload of the plurality of workloads, the hardware efficiency factor indicating a turn-on time of the hardware execution device for performing the workload, the hardware utilization factor indicating how efficiently the hardware execution device is utilized during the turn-on time, and generate, based on hardware efficiency factors and hardware utilization factors of the plurality of workloads, a power profile for the compiled NN model, wherein the plurality of workloads are for executing a layer of the compiled NN model, the layer having a tensor, wherein each of the plurality of workloads corresponds to a different portion of the tensor.

2. The system of claim 1, wherein the instructions, when executed, further cause the computing system to provide a configuration file to be used for generating the power profile.

3. The system of claim 1, wherein the instructions, when executed, further cause the computing system to generate an output visualization of the power profile.

4. The system of claim 1, wherein the instructions, when executed, further cause the computing system to generate feedback information for selecting a hardware device, optimizing a breakdown of workloads, optimizing a scheduling of tasks, or confirming a hardware device design.

5. A semiconductor apparatus, comprising:

one or more substrates; and logic coupled to the one or more substrates, wherein the logic is implemented at least partly in one or more of configurable logic or fixed-functionality hardware logic, the logic to:

obtain a plurality of workloads for a compiled neural network (NN) model, the plurality of workloads determined for a hardware execution device, determine hardware efficiency factors and hardware utilization factors for the plurality of workloads, a pair of a hardware efficiency factor and a hardware utilization factor determined for to a workload of the plurality of workloads, the hardware efficiency factor indicating a turn-on time of the hardware execution device for performing the workload, the hardware utilization factor indicating how efficiently the hardware execution device is utilized during the turn-on time, and generate, based on hardware efficiency factors and hardware utilization factors of the plurality of workloads, a power profile for the compiled NN model, wherein the plurality of workloads are for executing a layer of the compiled NN model, the layer having a tensor, wherein each of the plurality of workloads corresponds to a different portion of the tensor.

6. The apparatus of claim 5, wherein the logic is further to provide a configuration file to be used for generating the power profile.

7. The apparatus of claim 5, wherein the logic is further to generate an output visualization of the power profile.

8. The apparatus of claim 5, wherein the logic is further to generate feedback information for selecting a hardware device, optimizing a breakdown of workloads, optimizing a scheduling of tasks, or confirming a hardware device design.

9. At least one non-transitory computer readable storage medium comprising instructions which, when executed by a computing system, cause the computing system to:

obtain a plurality of workloads for a compiled neural network (NN) model, the plurality of workloads determined for a hardware execution device;

determine hardware efficiency factors and hardware utilization factors for the plurality of workloads, a pair of a hardware efficiency factor and a hardware utilization factor determined for to a workload of the plurality of workloads, the hardware efficiency factor indicating a turn-on time of the hardware execution device for performing the workload, the hardware utilization factor indicating how efficiently the hardware execution device is utilized during the turn-on time; and generate, based on hardware efficiency factors and hardware utilization factors of the plurality of workloads, a power profile for the compiled NN model, wherein the plurality of workloads are for executing a layer of the compiled NN model, the layer having a tensor, wherein each of the plurality of workloads corresponds to a different portion of the tensor.

10. The at least one non-transitory computer readable storage medium of claim 9, wherein the instructions, when executed, further cause the computing system to provide a configuration file to be used for generating the power profile.

11. The at least one non-transitory computer readable storage medium of claim 9, wherein the instructions, when executed, further cause the computing system to generate an output visualization of the power profile.

12. The at least one non-transitory computer readable storage medium of claim 9, wherein the instructions, when executed, further cause the computing system to generate feedback information for selecting a hardware device, optimizing a breakdown of workloads, optimizing a schedule of tasks, or confirming a hardware device design.

13. A method, comprising:

obtaining a plurality of workloads for a compiled neural network (NN) model, the plurality of workloads determined for a hardware execution device;

determining hardware efficiency factors and hardware utilization factors for the plurality of workloads, a pair of a hardware efficiency factor and a hardware utilization factor determined for to a workload of the plurality of workloads, the hardware efficiency factor indicating a turn-on time of the hardware execution device for performing the workload, the hardware utilization factor indicating how efficiently the hardware execution device is utilized during the turn-on time; and generating, based on hardware efficiency factors and hardware utilization factors of the plurality of workloads, a power profile for the compiled NN model, wherein the plurality of workloads are for executing a layer of the compiled NN model, the layer having a tensor, wherein each of the plurality of workloads corresponds to a different portion of the tensor.

14. The method of claim 13, further comprising providing a configuration file to be used for generating the power profile.

15. The method of claim 13, further comprising generating an output visualization of the power profile.

16. The method of claim 13, further comprising generating feedback information for selecting a hardware device, optimizing a breakdown of workloads, optimizing a scheduling of tasks, or confirming a hardware device design.

17. The computing system of claim 1, wherein the instructions cause the computing system to obtain the plurality of workloads by:

dividing the tensor into tiles; and dividing each tile into one or more groups of workloads, wherein the one or more groups of workloads are a subset of the plurality of workloads.

18. The apparatus of claim 5, wherein the logic is to obtain the plurality of workloads by:

dividing the tensor into tiles; and dividing each tile into one or more groups of workloads, wherein the one or more groups of workloads are a subset of the plurality of workloads.

19. The at least one non-transitory computer readable storage medium of claim 9, wherein the instructions cause the computing system to obtain the plurality of workloads by:

dividing the tensor into tiles; and dividing each tile into one or more groups of workloads, wherein the one or more groups of workloads are a subset of the plurality of workloads.

20. The method of claim 13, wherein obtaining the plurality of workloads comprises:

dividing the tensor into tiles; and dividing each tile into one or more groups of workloads, wherein the one or more groups of workloads are a subset of the plurality of workloads.

* * * * *